Figure 3:
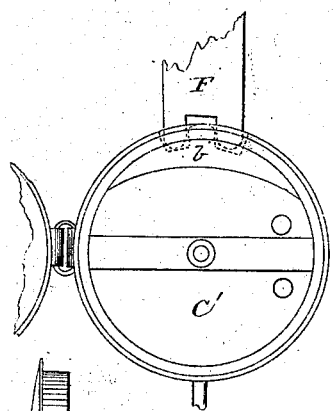

2 Sheets—Sheet 1.
J. M. PIPER.
CORN PLANTER.
No. 105,365.      Patented July 12, 1870.
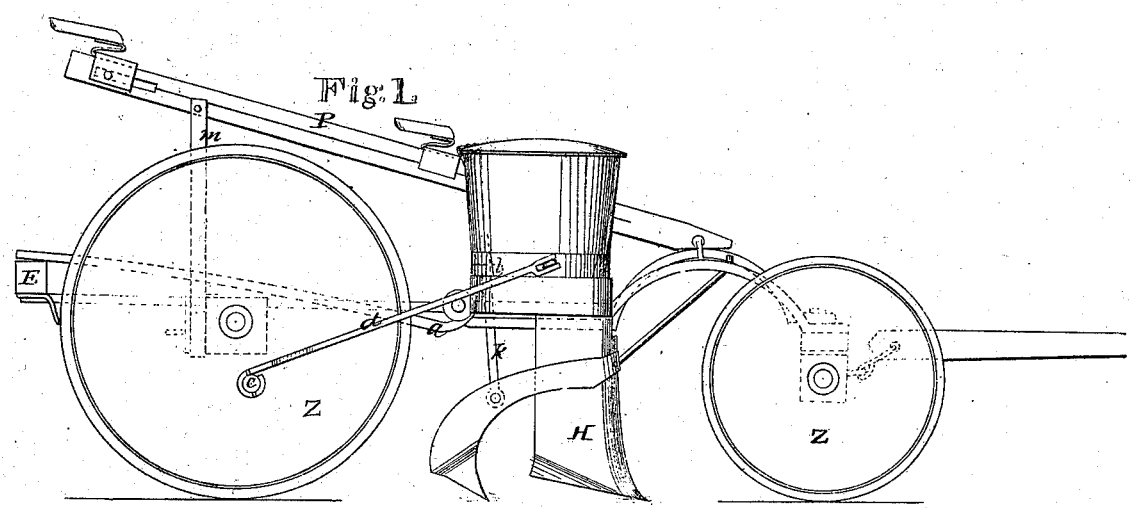
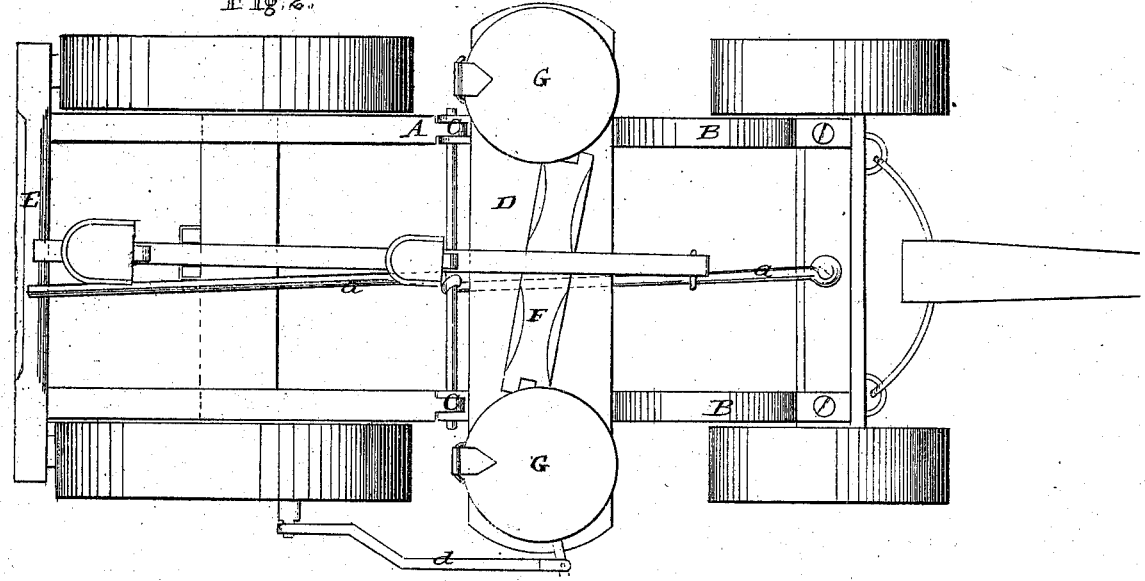
Witnesses.
Villette Anderson
Chas. Kenyon
Inventor.
James M. Piper
Chipman Hosmer & Co
Attorneys 2 Sheets—Sheet 2.

J. M. PIPER.
CORN PLANTER.

No. 105,365.          Patented July 12, 1870.

Witnesses.
Villette Anderson
Chas. Kenyon

Inventor.
James M. Piper
Chipman Hosmer & Co
Attorneys.

United States Patent Office.

JAMES M. PIPER, OF HARRISON CITY, PENNSYLVANIA.

Letters Patent No. 105,365, dated July 12, 1870.

IMPROVEMENT IN CORN-PLANTER.

The Schedule referred to in these Letters Patent and making part of the same.

*To all whom it may concern:*

Be it known that I, JAMES M. PIPER, of Harrison City, in the county of Westmoreland and State of Pennsylvania, have invented a new and valuable Improvement in Corn-Planters; and I do hereby declare that the following is a full, clear, and exact description of the construction and operation of the same, reference being had to the annexed drawing making a part of this specification, and to the letters and figures of reference marked thereon.

Figure 1, of the drawing, is a side view of my corn-planter.

Figure 2 is a top view thereof.

Figure 4:
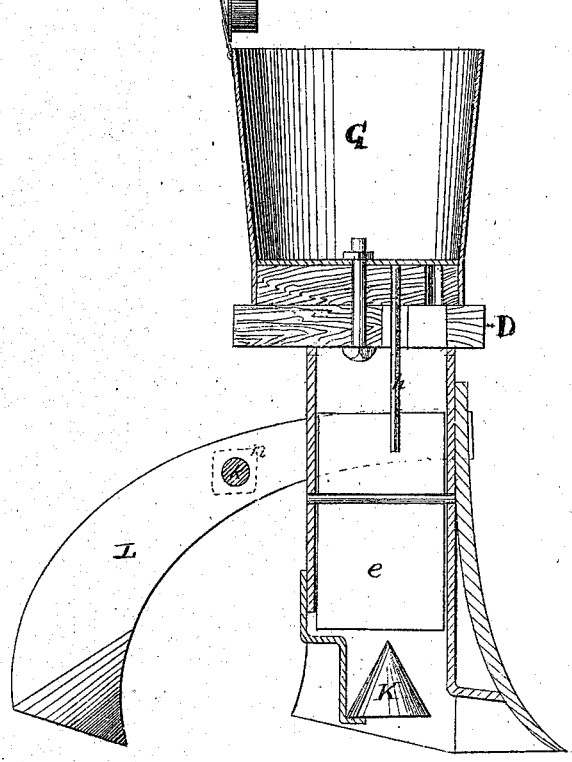
Figure 5:
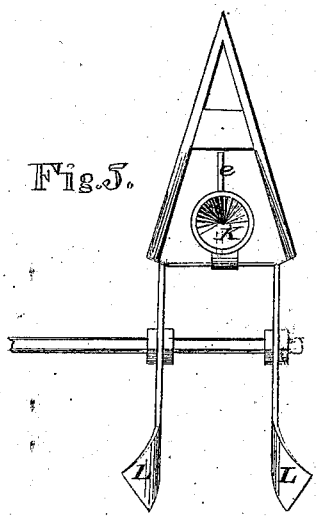

Figures 3, 4, and 5 are details.

My invention relates to corn-planters, and consists mainly in the construction and novel arrangement of devices designed to secure, in a four-wheel corn-planter, facility of turning, lightness of draft, and efficiency of operation. Each wheel is made broad, and serves to pulverize the ground, as well as to secure lightness of draft. The front portion of the frame is arched, in order that the forward wheels may turn thereunder. A hinge joint is provided between the front and rear wheels, whereby the plows and their attachments may be elevated from the ground when not in operation, and the depth of planting may be regulated. The shoes are provided with valves, arranged to secure certainty of deposit, and with scattering-cones near the ground, designed to spread the seed in the hill.

The letters A A, of the drawing, designate the main frame of the corn-planter, provided with the arches B B, for the passage of the front wheels in turning.

C represents the coupling hinge, whereby the forward portion of the frame is connected to the rear part thereof. By this arrangement the plows and their attachments can be readily regulated through the lever $a$, attached to the coupling-joint and to the forward frame.

D represents a plate, to which the rear ends of the arches B B are attached, and which serves to support the hoppers.

At the rear of the frame is attached a cross-bar, E, provided with suitable scrapers for cleaning the rear wheels.

C' C' represent reciprocating dropper-wheels, perforated for the passage of the grain, and provided with the cut-off plates $b$ $b$. Motion is communicated to one dropper-wheel by means of the crank $c$ and pitman $d$, attached to one of the rear wheels. The dropper-wheel of the other side receives its motion through the communicating lever F, which is pivoted to the bolster or plate D.

G G designate the hoppers in which the corn or seed is placed.

H H are the shoes or plows attached to the plate D. The hollow tubes which guide the corn to the furrow are provided with vibrating tongue-valves $e$ $e$, pivoted to the walls of the tubes, and operated, by means of the dropper-wheels, through the rods $h$, each of which passes through a slot in the plate D.

K is a cone attached to the lower part of each tube, in rear of the furrow, and designed to scatter the grain or seed while falling in the hill.

L L represent the covering hoes, adjusted by means of the screw-rod $k$ and nut $l$. They are adapted to receive the loose earth from the furrower, and to conduct or throw it inward over the grain.

The width of the hoes, which are pivoted in front of the tube of the furrower or shoe, may be regulated by means of the nuts $n$ $n$, working on the rod $k'$.

P designates a slotted beam resting on the upright $m$, and attached in front to the long lever $a$, and so constructed that, when necessary, the seat of the driver may be moved, transferring his weight to the rear wheels from the front wheels, and *vice versa*.

Z Z are the wheels upon which the corn-planter is mounted. They are provided with broad tires, and act as pulverizers or clod-breakers before the furrowers, while the rear wheels serve to level the hill after it is filled by the covering-hoes. The broad tires also serve to secure lightness of draft.

What I claim as my invention, and desire to secure by Letters Patent, is—

1. The arrangement of the pulverizing-wheels Z, jointed frame A, vertical arches B, slotted seat-rest P, dropper-wheels C', crank $c$, slotted plate D, adjustable hoes L, furrowing-shoes H, provided with tongue-valves $e$ and scattering-cones K, as and for the purposes specified.

2. The slotted plate D, the seed-dropper C', and furrower H, having tongue-valve $e$ and scattering-cone K, when constructed and arranged to operate as and for the purposes specified.

In testimony that I claim the above, I have hereunto subscribed my name in the presence of two witnesses.

JAMES M. PIPER.

Witnesses:
J. T. HARVEY,
S. P. PIPER.